US010820042B2

(12) United States Patent
Panje

(10) Patent No.: US 10,820,042 B2
(45) Date of Patent: Oct. 27, 2020

(54) MULTIPLEXED DELIVERY OF MEDIA ASSOCIATED WITH GUIDE DISPLAY OPTIONS

(71) Applicant: ARRIS Enterprises LLC, Suwanee, GA (US)

(72) Inventor: Krishna Prasad Panje, Bangalore (IN)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 15/707,063

(22) Filed: Sep. 18, 2017

(65) Prior Publication Data

US 2019/0090012 A1 Mar. 21, 2019

(51) Int. Cl.
*H04N 21/434* (2011.01)
*H04N 5/44* (2011.01)
*H04N 21/41* (2011.01)
*H04N 21/236* (2011.01)
*H04N 21/482* (2011.01)
*H04N 21/239* (2011.01)
*H04N 21/6587* (2011.01)
*H04N 7/16* (2011.01)

(52) U.S. Cl.
CPC ....... *H04N 21/4344* (2013.01); *H04N 5/4401* (2013.01); *H04N 21/2393* (2013.01); *H04N 21/23608* (2013.01); *H04N 21/23614* (2013.01); *H04N 21/4126* (2013.01); *H04N 21/4348* (2013.01); *H04N 21/482* (2013.01); *H04N 21/6587* (2013.01); *H04N 7/163* (2013.01)

(58) Field of Classification Search
CPC .......... H04N 21/4344; H04N 21/4126; H04N 21/23608
See application file for complete search history.

(56) References Cited

U.S. PATENT DOCUMENTS

| 2013/0212624 | A1 | 8/2013 | Okada |
| 2014/0059615 | A1 | 2/2014 | Sirpal et al. |
| 2014/0137155 | A1 | 5/2014 | Bayrakeri et al. |
| 2014/0325566 | A1 | 10/2014 | Roberts et al. |
| 2014/0373063 | A1 | 12/2014 | Funk et al. |
| 2015/0026723 | A1 | 1/2015 | Yuriy et al. |
| 2015/0331711 | A1* | 11/2015 | Huang ................. G06F 3/0481 719/320 |
| 2016/0353177 | A1* | 12/2016 | Gordon ................ H04N 21/482 |

* cited by examiner

*Primary Examiner* — Yassin Alata
(74) *Attorney, Agent, or Firm* — Buchanan Ingersoll & Rooney PC

(57) ABSTRACT

Methods, systems, and computer readable media can be operable to facilitate a multiplexed delivery of media associated with guide display options. A transport stream carrying media associated with a current context of an interactive guide application may be supplemented with one or more secondary streams that are associated with other contexts of the interactive guide application that are likely to be requested from subsequent user interactions. The other contexts of the interactive guide may be determined based upon a correlation between the other contexts and the current context of the interactive guide. When a user interaction occurs at a multimedia device, the multimedia device may retrieve a media stream associated with the user interaction from a transport stream that is currently being received by the multimedia device, from a buffer at the multimedia device, or from local storage associated with the multimedia device.

20 Claims, 10 Drawing Sheets

MULTIPLEXED DELIVERY OF MEDIA ASSOCIATED WITH GUIDE DISPLAY OPTIONS

TECHNICAL FIELD

This disclosure relates to multiplexed delivery of media associated with guide display options.

BACKGROUND

The delivery of cloud-based guide and/or user interfaces to CPE (customer premise equipment) devices such as set-top boxes (STB) as a transport stream is gaining popularity as it enables an MSO (multiple systems operator) to flexibly modify/update the look and feel of a guide/user interface without requiring software upgrades and/or browser updates. A cloud-based user interface may be delivered in the format of an MPEG-2 transport stream.

As a user browses or otherwise interacts with a guide (e.g., by pressing user remote keys), the CPE application may take those keys and send the action codes to the cloud server. Based on the guide context and the key codes received, the cloud server may construct a transport stream containing the video image to be rendered on the CPE device. The guide transport stream is typically constructed such that it has a window on the top left side where the currently watched channel is scaled and presented. Generally, the CPE device composites both videos to provide a Picture in Picture (PIP) effect (with the live video scaled and presented on one corner with guide video composited on top of it).

Latency is present in the generation and delivery of the guide transport stream as the server has to prepare the stream and provision the stream. There is also a CPE delay in receiving and presenting the new frame. A primary performance criteria for such guide display is to have minimum latency (the time between the key press and the display of the effects on the screen). This latency time is dependent on at least three factors: the time taken by the application to send the key codes to the server and server reliably receiving it; time taken by the server to construct a new transport stream; and the time taken by the CPE device to receive, decode and render the video image. The actions of sending a key from a CPE device to the guide server, constructing a resulting transport stream, and receiving the transport stream significantly increase latency in the presentation of a guide user interface.

Another aspect is the usage of bandwidth for a guide channel. It would be advantageous if additional information is conveyed within a transport stream during lean bandwidth usage times so that guide channel bandwidth is kept within limits with a quick guide response.

Therefore, it is desirable to improve upon methods and systems for delivering media associated with an interactive guide.

BRIEF DESCRIPTION OF THE DRAWINGS

Like reference numbers and designations in the various drawings indicate like elements.

DETAILED DESCRIPTION

It is desirable to improve upon methods and systems for delivering media associated with an interactive guide. Methods, systems, and computer readable media can be operable to facilitate a multiplexed delivery of media associated with guide display options. A transport stream carrying media associated with a current context of an interactive guide application may be supplemented with one or more secondary streams that are associated with other contexts of the interactive guide application that are likely to be requested from subsequent user interactions. The other contexts of the interactive guide may be determined based upon a correlation between the other contexts and the current context of the interactive guide. When a user interaction occurs at a multimedia device, the multimedia device may retrieve a media stream associated with the user interaction from a transport stream that is currently being received by the multimedia device, from a buffer at the multimedia device, or from local storage associated with the multimedia device.

Figure 1:
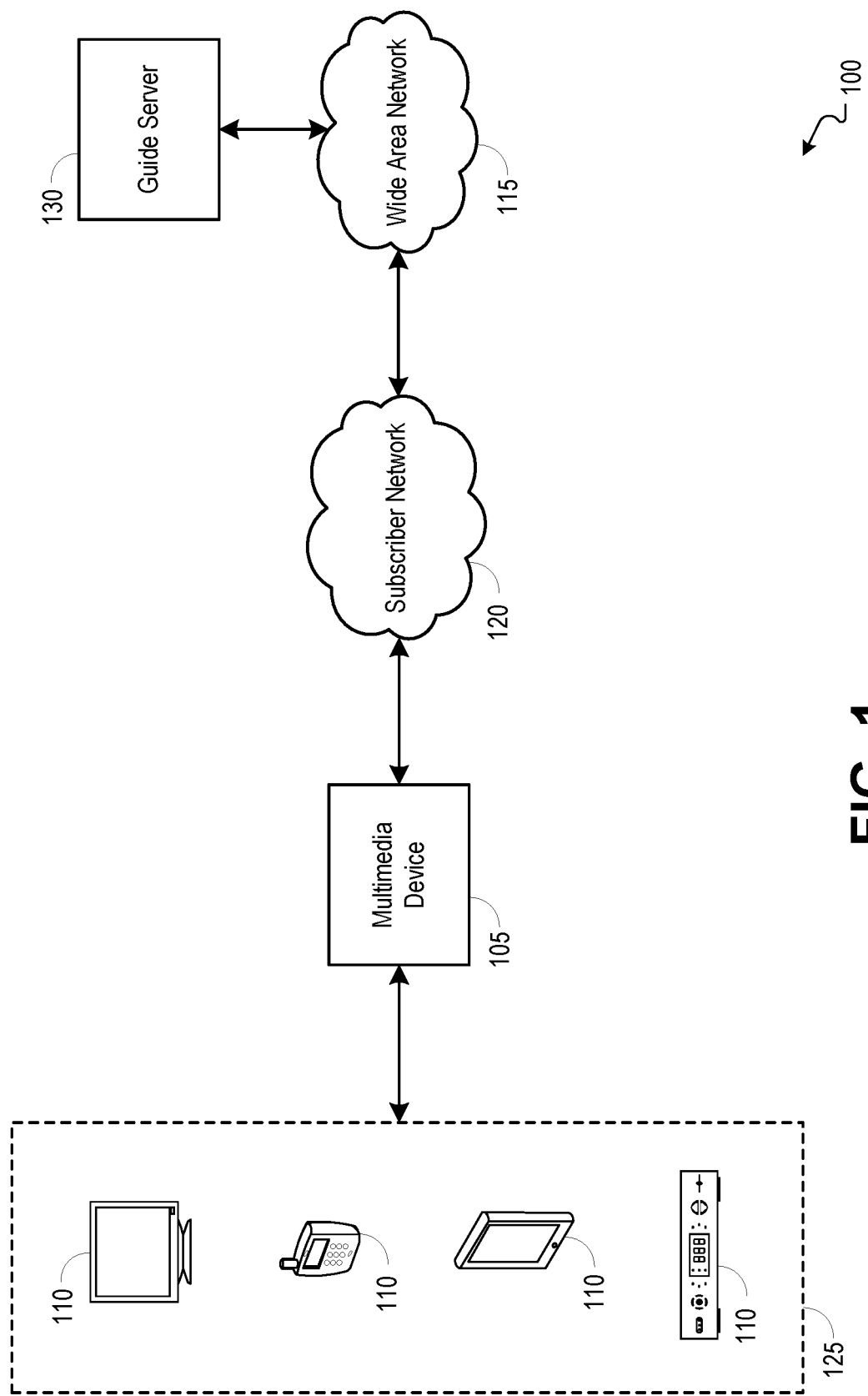
FIG. 1 is a block diagram illustrating an example network environment operable to facilitate a multiplexed delivery of media associated with guide display options.

FIG. 1 is a block diagram illustrating an example network environment 100 operable to facilitate a multiplexed delivery of media associated with guide display options. In embodiments, one or more multimedia devices 105 (e.g., set-top box (STB), multimedia gateway device, DLNA multimedia device, etc.) may provide video, data and/or voice services to one or more client devices 110 by communicating with a wide area network (WAN) 115 through a connection to a subscriber network 120 (e.g., a local area network (LAN), a wireless local area network (WLAN), a personal area network (PAN), mobile network, high-speed wireless network, etc.). For example, a subscriber can receive and request video, data and/or voice services through a variety of types of client devices 110, including but not limited to a television, computer, tablet, mobile device, STB, and others. It should be understood that a multimedia device 105 may communicate directly with, and receive one or more services directly from a subscriber network 120 or WAN 115. A client device 110 may receive the requested services through a connection to a multimedia device 105, through a direct connection to a subscriber network 120 (e.g., mobile network), through a direct connection to a WAN 115, or through a connection to a local network 125 that is provided by a multimedia device 105 or other access point within an associated premise. While the components shown in FIG. 1 are shown separate from each other, it should be understood that the various components can be integrated into each other.

In embodiments, an interactive guide may be presented to a user through a display (e.g., client device 110) that is connected to a multimedia device 105. Through an interface associated with the multimedia device 105 (e.g., key codes received from a control device such as a remote control unit (RCU)), a user may navigate the interactive guide to view program scheduling of one or more channels, to select programs for recording, or to view information associated with a program. For example, the interactive guide may be generated from electronic program guide (EPG) data. The interactive guide may be generated, maintained, and output to a multimedia device by a guide server 130. For example, in response to user initiated actions taken with respect to an interactive guide, the guide server 130 may generate a media stream that includes video and/or audio associated with the user initiated actions. The guide server 130 may add the media stream to a transport stream and may output the transport stream to a multimedia device 105.

In embodiments, the video and/or audio associated with an interactive guide may be generated based upon a current context of the interactive guide. The context of the interactive guide may include the information currently presented to a user through a presentation of the interactive guide. The context of the interactive guide may further include a user-interaction (e.g., received button press or key code) with the interactive guide. Depending upon the current context of the interactive guide, the guide server 130 may determine one or more subsequent user actions that are likely to be performed. For example, after a user launches an interactive guide, it may be likely that the user will subsequently request to browse (e.g., next/previous, up/down, etc.) the guide data presented within the interactive guide. The determination of one or more subsequent user actions may be based a user-interaction history associated with a multimedia device 110, wherein the user-interaction history includes a count identifying the number of times each of one or more user actions is initiated following one or more other user actions. The determination of one or more subsequent user actions may be based upon default or user-configured (e.g., configured by end-user or MSO (multiple systems operator)) settings identifying one or more subsequent user actions associated with each of one or more user actions or current interactive guide contexts.

In embodiments, the guide server 130 may generate a media stream for each of the one or more subsequent user actions that are determined to be likely to occur based upon the current context of the interactive guide. Each respective one media stream may include video and/or audio associated with a respective subsequent user action. Each of the generated media streams may be added to the transport stream carrying the media stream associated with the current context. Each of the media streams within the transport stream may be given a unique identifier (e.g., PID (packet identifier)). For example, the media streams associated with the subsequent user actions may be multiplexed with the media stream associated with the current context of the interactive guide. The unique identifier given to each media stream associated with a subsequent user action may be mapped to a corresponding user action that may require the video and/or audio carried by the media stream. For example, a PID assigned to a media stream may be earmarked for retrieval from the transport stream in response to a certain user action. Alternatively, a PID assigned to a media stream may be numbered such that the PID indicates the key action necessitating retrieval of the media stream (e.g., key press of "right" would be given a PID number incremented by one compared to the PID number of main guide video).

In embodiments, when a multimedia device 105 receives a transport stream carrying a media stream associated with a current interactive guide context and one or more media streams associated with one or more subsequent user actions, the multimedia device 105 may identify, decode, and output for display the video and/or audio carried by a media stream that is associated with a user action initiated at the multimedia device 105. For example, when a user action is initiated at the multimedia device 105, the multimedia device 105 may determine whether the transport stream received by the multimedia device 105 includes a media stream associated with the user action. The multimedia device 105 may determine the one or more user actions associated with the one or more media streams of the transport stream based upon a mapping of the media streams to user actions (e.g., based upon the PIDs of the media streams). For example, metadata or an interpretation of PID numbers may be utilized by a multimedia device 105 to identify one or more media streams within a transport stream that are associated with a certain user action. When one or more media streams associated with a requested user action are identified, the one or more media streams may be retrieved from the transport stream and decoded for presentation. Thus, the one or more media streams may be output to a display without first requesting the media streams from an upstream server (e.g., guide server 130).

In embodiments, a multimedia device 105 may perform a live-off-disk (LOD) recording or buffering of a received transport stream carrying a media stream associated with a current interactive guide context and/or one or more media streams associated with one or more subsequent user actions. The multimedia device 105 may present the media associated with the current interactive guide context along with scaled channel program video (e.g., PIP (picture-in-picture)), and the media associated with the current interactive guide context may be presented from a circular buffer of DVR (digital video recorder)/RAM (random-access memory) (e.g., LOD buffer). Media associated with previous user actions with respect to the interactive guide may be stored within the LOD buffer. In response to a user action (e.g., browsing action or other action associated with previously received media), the multimedia device 105 may identify and retrieve media associated with the user action from the LOD buffer. With guide media stored within an LOD buffer, the media may be presented from the LOD buffer rather than being requested and retrieved from an upstream server (e.g., guide server 130).

In embodiments, a transport stream carrying a media stream associated with a current interactive guide context may be supplemented with one or more video images or media streams associated with one or more static pages (e.g., program information pages associated with one or more programs, etc.). For example, based upon a current guide context (e.g., user interface context, time of day, etc.), an upstream server (e.g., guide server 130) may identify one or more static pages that are likely to be requested by a user. The guide server 130 may generate video images associated with the identified static pages and may include the video images within a transport stream carrying a media stream associated with a current interactive guide context to a multimedia device 105. The guide server 130 may tag each respective one of the video images to identify a user action that may require or produce the respective image. The guide server 130 may add video images to a multiplexed transport stream during periods of lean bandwidth usage. The video images may be static images or may be media streams (e.g., low bitrate stream).

In embodiments, a multimedia device 105 may record or store video images received within a transport stream, and when a user action is carried out at the multimedia device 105, the guide server 130 may instruct the multimedia device 105 to retrieve a video image associated with the user action from local storage (e.g., DVR/RAM of the multimedia device 105) if the video image has been previously delivered to the multimedia device 105. In response, the multimedia device 105 may retrieve the video image from local storage and present the video image for display.

Figure 2:
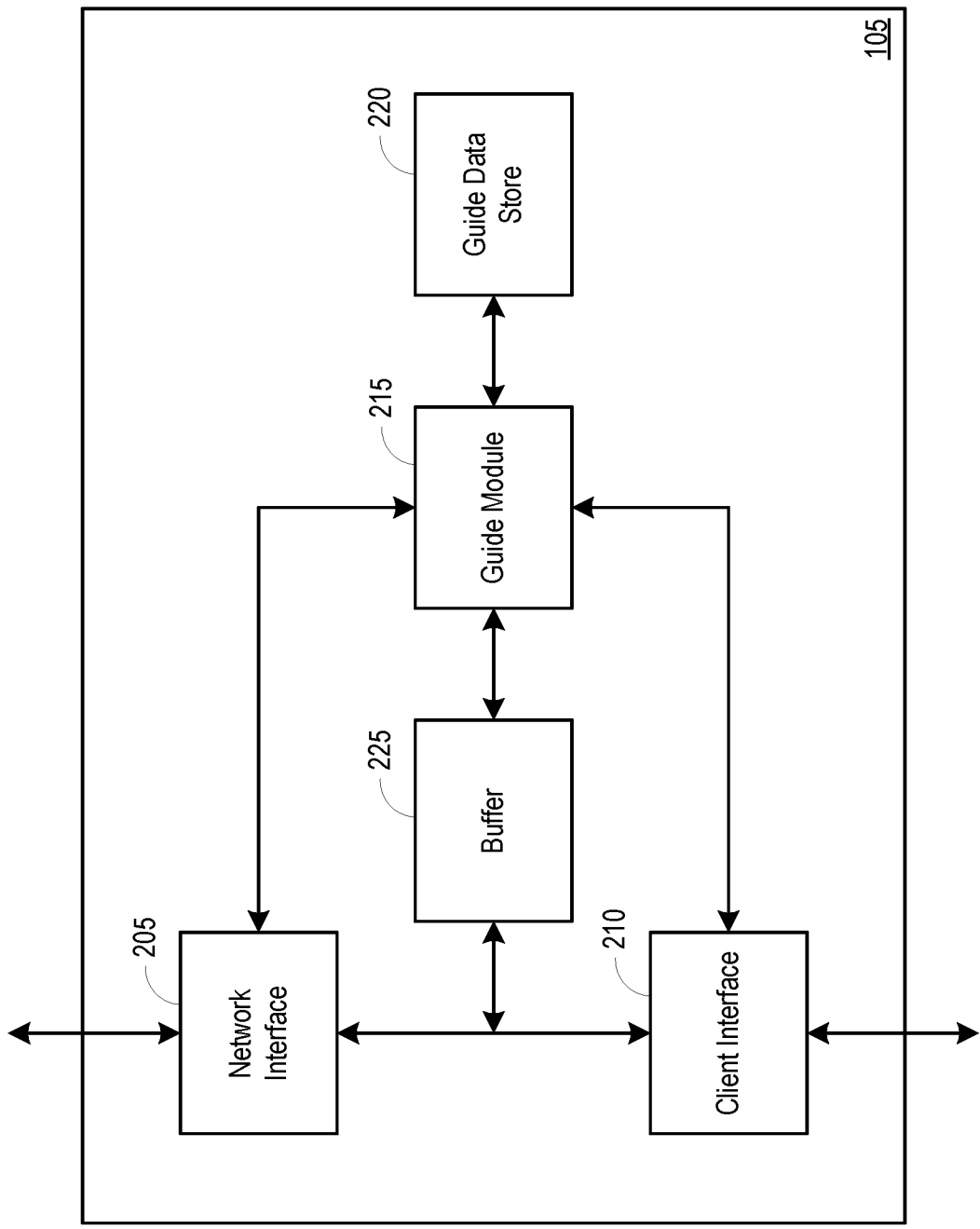
FIG. 2 is a block diagram illustrating an example multimedia device operable to facilitate a multiplexed delivery of media associated with guide display options.

FIG. 2 is a block diagram illustrating an example multimedia device 105 operable to facilitate a multiplexed delivery of media associated with guide display options. The multimedia device 105 may include a network interface 205, a client interface 210, a guide module 215, a guide data store 220, and a buffer 225. It should be understood that the multimedia device 105 may include a multimedia gateway or STB configured to provide video services to one or more display devices or client devices 110 of FIG. 1.

In embodiments, the network interface 205 may include one or more tuners, wherein each of the one or more tuners may be tuned to a channel to receive content carried over the channel. For example, each tuner 205 may be tuned to a frequency that is associated with a certain channel, and the frequency to which each tuner 205 is tuned may be controlled by requests received from user input to the multimedia device 105 or requests received from one or more client devices 110 of FIG. 1 through the client interface 210. It should be understood that the network interface 205 may include any interface configured to receive one or more services (e.g., data, video content, etc.) delivered to the multimedia device 105 as a signal or communication.

In embodiments, an interactive guide may be presented to a user through a display (e.g., client device 110) that is connected to a multimedia device 105. Through communications delivered to the multimedia device 105 via the client interface 210 (e.g., key codes received from a control device such as a remote control unit (RCU)), a user may navigate the interactive guide to view program scheduling of one or more channels, to select programs for recording, or to view information associated with a program. For example, the interactive guide may be generated from electronic program guide (EPG) data. The interactive guide may be generated, maintained, and output to a multimedia device by an upstream server (e.g., guide server 130 of FIG. 1). For example, in response to user initiated actions taken with respect to an interactive guide, the guide server 130 may generate a media stream that includes video and/or audio associated with the user initiated actions. The guide server 130 may add the media stream to a transport stream and may output the transport stream to the multimedia device 105.

In embodiments, the video and/or audio associated with an interactive guide may be generated based upon a current context of an interactive guide being run at the multimedia device 105. The context of the interactive guide may include the information currently presented to a user through a presentation of the interactive guide. The context of the interactive guide may further include a user-interaction (e.g., received button press or key code) with the interactive guide. Depending upon the current context of the interactive guide, the guide server 130 may determine one or more subsequent user actions that are likely to be performed. For example, after a user launches an interactive guide, it may be likely that the user will subsequently request to browse (e.g., next/previous, up/down, etc.) the guide data presented within the interactive guide. The determination of one or more subsequent user actions may be based upon a user-interaction history associated with a multimedia device 110, wherein the user-interaction history includes a count identifying the number of times each of one or more user actions is initiated following one or more other user actions. The determination of one or more subsequent user actions may be based upon default or user-configured (e.g., configured by end-user or MSO (multiple systems operator)) settings identifying one or more subsequent user actions associated with each of one or more user actions or current interactive guide contexts.

In embodiments, the guide server 130 may generate a media stream for each of the one or more subsequent user actions that are determined to be likely to occur based upon the current context of the interactive guide. Each respective one media stream may include video and/or audio associated with a respective subsequent user action. Each of the generated media streams may be added to the transport stream carrying the media stream associated with the current context. Each of the media streams within the transport stream may be given a unique identifier (e.g., PID (packet identifier)). For example, the media streams associated with the subsequent user actions may be multiplexed with the media stream associated with the current context of the interactive guide. The unique identifier given to each media stream associated with a subsequent user action may be mapped to a corresponding user action that may require the video and/or audio carried by the media stream. For example, a PID assigned to a media stream may be earmarked for retrieval from the transport stream in response to a certain user action. Alternatively, a PID assigned to a media stream may be numbered such that the PID indicates the key action necessitating retrieval of the media stream (e.g., key press of "right" would be given a PID number incremented by one compared to the PID number of main guide video).

In embodiments, when a multimedia device 105 receives a transport stream (e.g., through the network interface 205) carrying a media stream associated with a current interactive guide context and one or more media streams associated with one or more subsequent user actions, the guide module 215 may identify, decode, and output for display the video and/or audio carried by a media stream that is associated with a user action initiated at the multimedia device 105. For example, when a user action is initiated at the multimedia device 105, the guide module 215 may determine whether the transport stream received by the multimedia device 105 includes a media stream associated with the user action. The guide module 215 may determine the one or more user actions associated with the one or more media streams of the transport stream based upon a mapping of the media streams to user actions (e.g., based upon the PIDs of the media streams). For example, metadata or an interpretation of PID numbers may be utilized by the guide module 215 to identify one or more media streams within a transport stream that are associated with a certain user action. When one or more media streams associated with a requested user action are identified, the one or more media streams may be retrieved from the transport stream and decoded for presentation. Thus, the one or more media streams may be output to a display without first requesting the media streams from an upstream server (e.g., guide server 130). For example, the guide module 215 may retrieve the one or more media streams from the transport stream, and the guide module 215 may output the one or more media streams to a display through the client interface 210.

In embodiments, a multimedia device 105 may perform a live-off-disk (LOD) recording or buffering of a received transport stream carrying a media stream associated with a current interactive guide context and/or one or more media streams associated with one or more subsequent user actions. For example, the transport stream may be stored within a buffer 225. The buffer 225 may include a circular buffer, LOD buffer, or other type of buffer. The multimedia device 105 may present the media associated with the current interactive guide context along with scaled channel program video (e.g., PIP (picture-in-picture)), and the media associated with the current interactive guide context may be presented from the buffer 225. Media associated with previous user actions with respect to the interactive guide may be stored within the buffer 225. In response to a user action (e.g., browsing action or other action associated with previously received media), the guide module 215 may identify and retrieve media associated with the user action from the buffer 225. With guide media stored within the buffer 225, the media may be presented from the buffer 225 rather than being requested and retrieved from an upstream server (e.g., guide server 130).

In embodiments, a transport stream carrying a media stream associated with a current interactive guide context may be supplemented with one or more video images associated with one or more static pages (e.g., program information pages associated with one or more programs, etc.). For example, based upon a current guide context (e.g., user interface context, time of day, etc.), an upstream server (e.g., guide server 130) may identify one or more static pages that are likely to be requested by a user. The guide server 130 may generate video images associated with the identified static pages and may include the video images within a transport stream carrying a media stream associated with a current interactive guide context to the multimedia device 105. The guide server 130 may tag each respective one of the video images to identify a user action that may require or produce the respective image. The guide server 130 may add video images to a multiplexed transport stream during periods of lean bandwidth usage.

In embodiments, the guide module 215 may identify and record or store (e.g., at the guide data store 220) video images received within a transport stream, and when a user action is carried out at the multimedia device 105, the guide server 130 may instruct the guide module 215 to retrieve a video image associated with the user action from local storage (e.g., guide data store 220) if the video image has been previously delivered to the multimedia device 105. In response, the guide module 215 may retrieve the video image from the guide data store 220 and present the video image for display (e.g., through the client interface 210).

Figure 3:
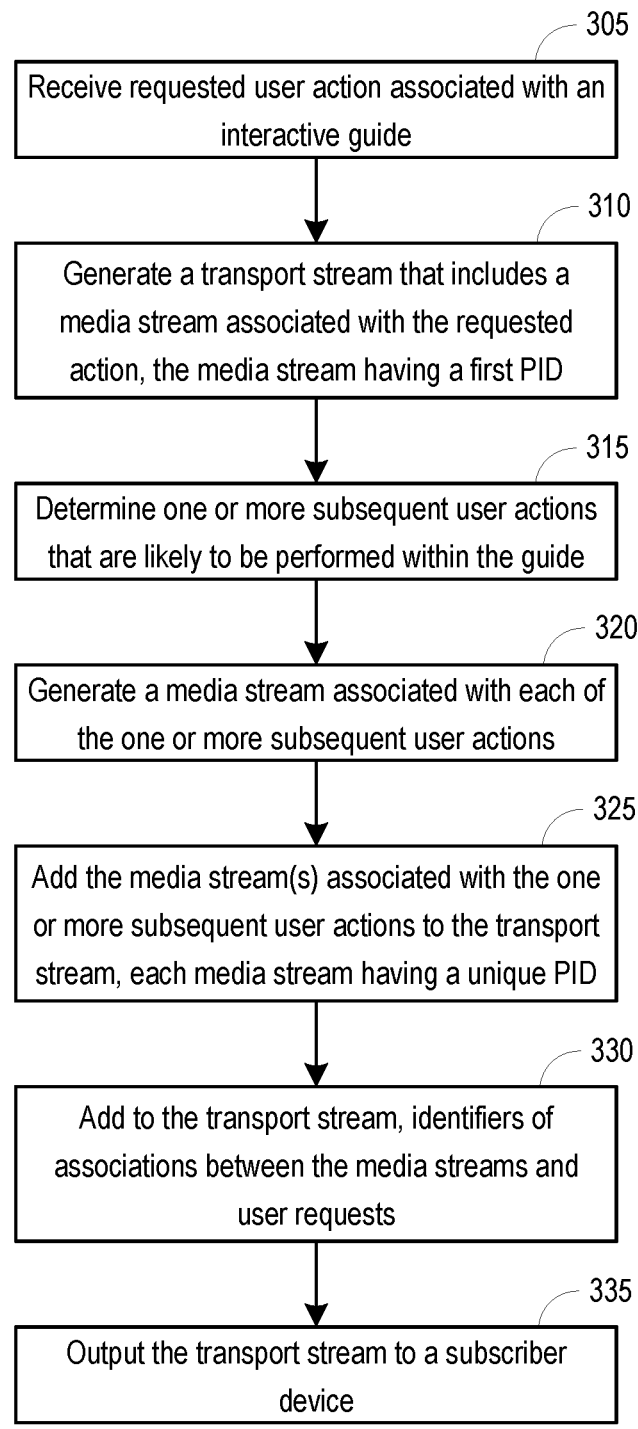
FIG. 3 is a flowchart illustrating an example process operable to facilitate the generation and output of a transport stream that includes a media stream associated with a current interactive guide context and one or more media streams associated with one or more subsequent user actions.

FIG. 3 is a flowchart illustrating an example process 300 operable to facilitate the generation and output of a transport stream that includes a media stream associated with a current interactive guide context and one or more media streams associated with one or more subsequent user actions. The process 300 may be carried out, for example, by a guide server 130 of FIG. 1 or any other server that is configured to deliver guide data or guide media streams to a multimedia device (e.g., multimedia device 105 of FIG. 1). The process 300 can begin at 305, when a requested user action associated with an interactive guide is received. The requested user action may be received at a guide server 130. For example, a requested user action may include a navigation request (e.g., browsing action) or any other action causing a display of an interactive guide to change. The requested user action may be received at a multimedia device 105 and may be communicated upstream to the guide server 130.

At 310, a transport stream that includes a media stream associated with the requested action may be generated, wherein the media stream associated with the requested action has a first unique identifier (e.g., PID (packet identifier)). The transport stream may be generated, for example, by the guide server 130. In embodiments, the guide server 130 may generate a media stream that includes video and/or audio associated with the requested user action (e.g., the user action received by the guide server 130 at 305), and the media stream may be added to a transport stream that is to be delivered to a multimedia device (e.g., the multimedia device from which the requested user action was received).

At 315, one or more subsequent user actions that are likely to be performed within the interactive guide may be determined. The one or more subsequent actions may be determined, for example, by the guide server 130. In embodiments, the guide server 130 may determine a current context of an interactive guide presented at a multimedia device 105 (e.g., information currently presented to a user through a presentation of the interactive guide), and based upon the current context, the guide server 130 may determine the one or more subsequent actions that are likely to be performed. The determination of one or more subsequent user actions may be based upon a user-interaction history associated with a multimedia device 110, wherein the user-interaction history includes a count identifying the number of times each of one or more user actions is initiated following one or more other user actions. The determination of one or more subsequent user actions may be based upon default or user-configured (e.g., configured by end-user or MSO (multiple systems operator)) settings identifying one or more subsequent user actions associated with each of one or more user actions or current interactive guide contexts.

At 320, a media stream associated with each of the one or more subsequent user actions may be generated. The media stream(s) associated with the subsequent user action(s) may be generated, for example, by the guide server 130. In embodiments, the guide server 130 may generate a media stream for each of the one or more subsequent user actions that are determined to be likely to occur based upon the current context of the interactive guide. Each respective one media stream may include video and/or audio associated with a respective subsequent user action.

At 325, the media stream(s) associated with the one or more subsequent user actions may be added to the transport stream, and each media stream may be given a unique identifier (e.g., unique PID). The media stream(s) may be added to the transport stream carrying the media stream associated with the current context (e.g., the transport stream generated at 310), for example, by the guide server 130. Each of the media streams within the transport stream may be given a unique identifier (e.g., PID (packet identifier)). In embodiments, the unique identifier given to each individual media stream may be based upon a mapping between the media stream and a certain user action. For example, the unique identifier given to each media stream associated with a subsequent user action may be mapped to a corresponding user action that may require the video and/or audio carried by the media stream.

At 330, identifiers of associations between the media streams and user requests may be added to the transport stream. The identifiers may be added to the transport stream, for example, by the guide server 130. In embodiments, an identifier may include a mapping between a unique identifier associated with a media stream and a user request. The unique identifier given to each media stream associated with a subsequent user action may be mapped to a corresponding user action that may require the video and/or audio carried by the media stream. For example, a PID assigned to a media stream may be earmarked for retrieval from the transport stream in response to a certain user action. Alternatively, a PID assigned to a media stream may be numbered such that the PID indicates the key action necessitating retrieval of the media stream (e.g., key press of "right" would be given a PID number incremented by one compared to the PID number of main guide video).

At 335, the transport stream may be output to a subscriber device. For example, the guide server 130 may output the transport stream, including the media stream associated with the requested action and the one or more media streams associated with subsequent user actions, to a multimedia device 105 (e.g., the multimedia device 105 from which the requested user action was received).

Figure 4:
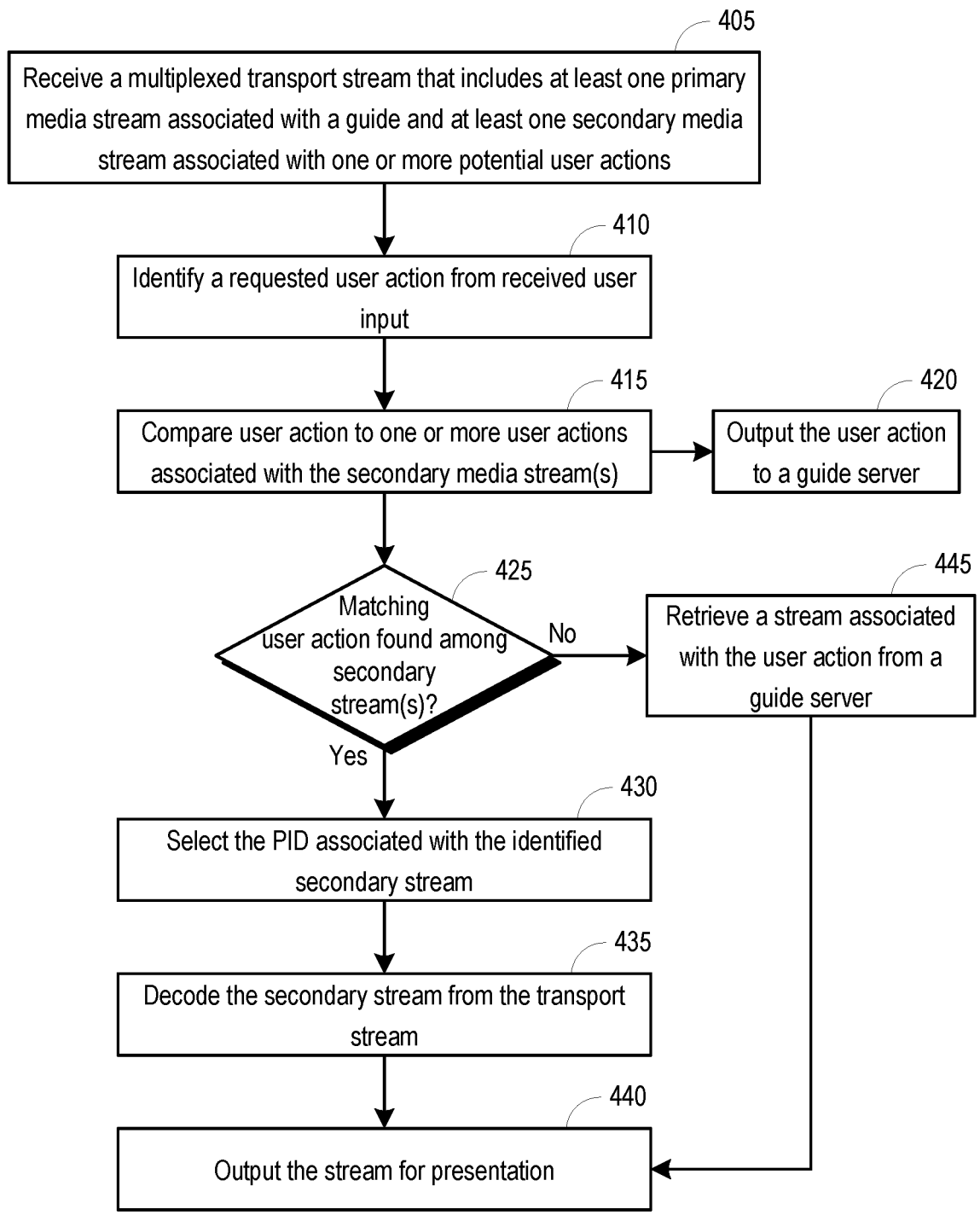
FIG. 4 is a flowchart illustrating an example process operable to facilitate a retrieval of a media stream from a transport stream, wherein the media stream is associated with a requested guide action, and wherein the transport stream carries a media stream associated with a current context of the guide.

FIG. 4 is a flowchart illustrating an example process 400 operable to facilitate a retrieval of a media stream from a transport stream, wherein the media stream is associated with a requested guide action, and wherein the transport stream carries a media stream associated with a current context of the guide. The process 400 may be carried out, for example, by a multimedia device 105 of FIG. 1 or any other device configured to receive a transport stream carrying media associated with a guide. The process 400 can begin at 405, when a multiplexed transport stream is received, wherein the multiplexed transport stream includes at least one primary media stream associated with a guide and at least one secondary media stream associated with one or more potential user actions. In embodiments, the transport stream may be received at a multimedia device 105 and may include a primary media stream associated with a current interactive guide context and one or more secondary media streams that are associated with one or more user actions that are likely to be subsequently requested based upon the current guide context.

At 410, a requested user action may be identified from received user input. A requested user action may be identified, for example, by the multimedia device 105 (e.g., by a guide module 215 of FIG. 2). In embodiments, the multimedia device 105 may detect a user interaction (e.g., browse request, search request, request for additional information screens, etc.) with an interactive guide that is being presented or displayed to the user. A user interaction with a guide may include any communication or request that causes a current presentation of media associated with the guide to be altered.

At 415, the requested user action may be compared to one or more user actions associated with the secondary media stream(s) of the received transport stream. The requested user action may be compared to the user action(s) associated with the secondary media stream(s), for example, by the multimedia device 105 (e.g., by a guide module 215). In embodiments, the guide module 215 may determine the one or more user actions associated with the one or more media streams of the transport stream based upon a mapping of the media streams to user actions (e.g., based upon the PIDs of the media streams). For example, metadata or an interpretation of PID numbers may be utilized by the guide module 215 to identify one or more media streams within a transport stream that are associated with a certain user action.

At 420, the requested user action may be output to a guide server. In embodiments, the requested user action may be output from the multimedia device 105 to an upstream guide server (e.g., guide server 130 of FIG. 1), and the upstream guide server may update a current guide context for the multimedia device 105 to reflect a current context that is based upon the requested user action. For example, where the requested user action is browse request that includes a directional component (e.g., browse left/right or up/down), the guide server 130 may update a current context for the multimedia device 105 with a media stream that includes audio/video associated with a display that results from the requested user action, and the updated media stream may be added to a transport stream to be delivered to the multimedia device 105.

At 425, a determination may be made whether the requested user action matches a user action associated with a secondary media stream of the received transport stream. The determination whether the requested user action matches a user action associated with a secondary media stream of the received transport stream may be made, for example, by the multimedia device 105 (e.g., by a guide module 215). In embodiments, the determination whether the requested user action matches a user action associated with a secondary media stream of the received transport stream may be based upon the comparison between the requested user action and the user actions associated with the secondary media streams of the received transport stream (e.g., the comparison between user actions made at 415).

If, at 425, the determination is made that the requested user action matches a user action associated with a secondary media stream of the received transport stream, the process 400 may proceed to 430. At 430, a unique identifier (e.g., PID) associated with the identified secondary stream may be selected. The unique identifier associated with the identified secondary stream (e.g., the secondary stream associated with a user action that matches the requested user action as determined at 420) may be identified from the received transport stream and may be selected, for example, by the multimedia device 105 (e.g., by the guide module 215).

At 435, the identified secondary media stream may be decoded from the transport stream. The identified secondary media stream may be decoded, for example, by the multimedia device 105 (e.g., by the guide module 215). In embodiments, the guide module 215 may decode the identified secondary media stream by utilizing the unique identifier (e.g., PID) associated with the identified secondary media stream.

At 440, the stream may be output for presentation. For example, the stream may be output from the multimedia device 105 for presentation at a display device (e.g., client device 110 of FIG. 1).

Returning to 425, if the determination is made that the requested user action does not match a user action associated with a secondary media stream of the received transport stream, the process 400 may proceed to 445. At 445, a stream associated with the user action may be retrieved from a guide server. The stream associated with the user action may be retrieved from the guide server (e.g., guide server 130 of FIG. 1), for example, by the multimedia device 105. In embodiments, the multimedia device 105 (e.g., the guide module 215) may output a request for the media stream associated with the user action, and the request may be output to the guide server 130. The media stream associated with the user action may be received at the multimedia device 105 within a transport stream that is delivered from the guide server 130. The multimedia device 105 may identify and retrieve the media stream associated with the user action from the transport stream and may output the stream for presentation at 440.

Figure 5:
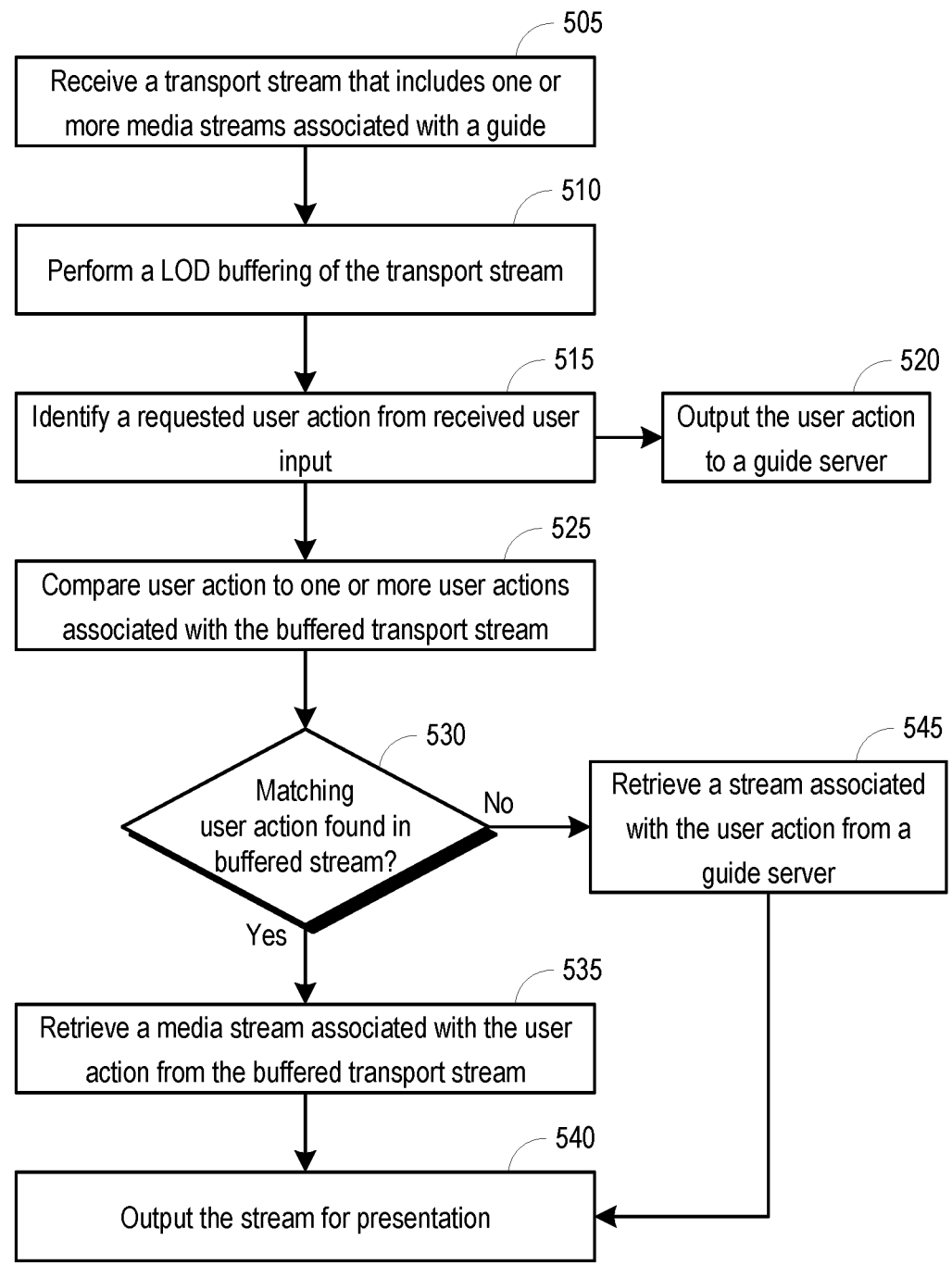
FIG. 5 is a flowchart illustrating an example process operable to facilitate a retrieval of a media stream from a LOD buffer, wherein the media stream is associated with a requested guide action.

FIG. 5 is a flowchart illustrating an example process 500 operable to facilitate a retrieval of a media stream from a LOD buffer, wherein the media stream is associated with a requested guide action. The process 500 may be carried out, for example, by a multimedia device 105 of FIG. 1 or any other device configured to receive a transport stream carrying media associated with a guide. The process 500 can begin at 505, when a multiplexed transport stream is received, wherein the multiplexed transport stream includes at least one primary media stream associated with a guide and at least one secondary media stream associated with one or more potential user actions. In embodiments, the transport stream may be received at a multimedia device 105 and may include a primary media stream associated with a current interactive guide context and one or more secondary media streams that are associated with one or more user actions that are likely to be subsequently requested based upon the current guide context.

At 510, a LOD buffering of the received transport stream may be performed. The LOD buffering of the transport stream may be performed, for example, by the multimedia device 105. In embodiments, the received transport stream may be buffered at a buffer 225 of FIG. 2 of the multimedia device 105.

At 515, a requested user action may be identified from received user input. A requested user action may be identified, for example, by the multimedia device 105 (e.g., by a guide module 215 of FIG. 2). In embodiments, the multimedia device 105 may detect a user interaction (e.g., browse request, search request, request for additional information screens, etc.) with an interactive guide that is being presented or displayed to the user. A user interaction with a guide may include any communication or request that causes a current presentation of media associated with the guide to be altered.

At 520, the requested user action may be output to a guide server. In embodiments, the requested user action may be output from the multimedia device 105 to an upstream guide server (e.g., guide server 130 of FIG. 1), and the upstream guide server may update a current guide context for the multimedia device 105 to reflect a current context that is based upon the requested user action. For example, where the requested user action is a browse request that includes a directional component (e.g., browse left/right or up/down), the guide server 130 may update a current context for the multimedia device 105 with a media stream that includes audio/video associated with a display that results from the requested user action, and the updated media stream may be added to a transport stream to be delivered to the multimedia device 105.

At 525, the requested user action may be compared to one or more user actions associated with the buffered transport stream. The requested user action may be compared to the user action(s) associated with the buffered transport stream, for example, by the multimedia device 105 (e.g., by a guide module 215). In embodiments, the guide module 215 may determine the one or more user actions associated with the one or more media streams of the buffered transport stream based upon a mapping of the media streams to user actions (e.g., based upon the PIDs of the media streams). For example, metadata or an interpretation of PID numbers may be utilized by the guide module 215 to identify one or more media streams within the buffered transport stream that are associated with a certain user action.

At 530, a determination may be made whether the requested user action matches a user action associated with a media stream of the buffered transport stream. The determination whether the requested user action matches a user action associated with a media stream of the buffered transport stream may be made, for example, by the multimedia device 105 (e.g., by a guide module 215). In embodiments, the determination whether the requested user action matches a user action associated with a media stream of the buffered transport stream may be based upon the comparison between the requested user action and the user actions associated with the media stream(s) of the buffered transport stream (e.g., the comparison between user actions made at 525).

If, at 530, the determination is made that the requested user action matches a user action associated with a media stream of the buffered transport stream, the process 500 may proceed to 535. At 535, a media stream associated with the requested user action may be retrieved from the buffered transport stream. For example, the multimedia device 105 (e.g., the guide module 215) may retrieve the media stream associated with the requested action from the buffer 225).

At 540, the stream may be output for presentation. For example, the stream may be output from the multimedia device 105 for presentation at a display device (e.g., client device 110 of FIG. 1).

Returning to 530, if the determination is made that the requested user action does not match a user action associated with a media stream of the buffered transport stream, the process 500 may proceed to 545. At 545, a stream associated with the user action may be retrieved from a guide server. The stream associated with the user action may be retrieved from the guide server (e.g., guide server 130 of FIG. 1), for example, by the multimedia device 105. In embodiments, the multimedia device 105 (e.g., the guide module 215) may output a request for the media stream associated with the user action, and the request may be output to the guide server 130. The media stream associated with the user action may be received at the multimedia device 105 within a transport stream that is delivered from the guide server 130. The multimedia device 105 may identify and retrieve the media stream associated with the user action from the transport stream and may output the stream for presentation at 540.

Figure 6:
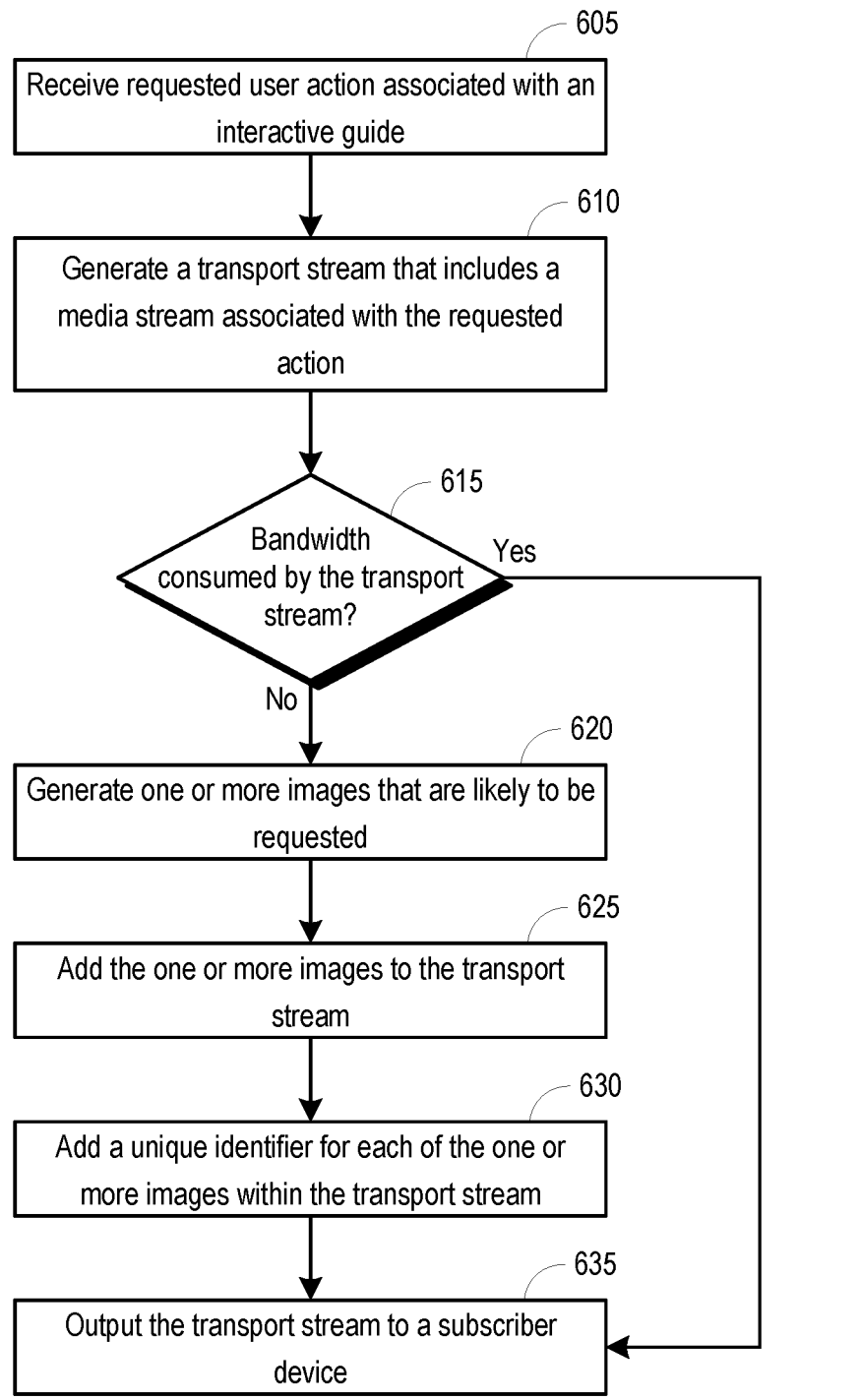
FIG. 6 is a flowchart illustrating an example process operable to facilitate the generation and output of a transport stream that includes one or more images that are likely to be requested by a user.

FIG. 6 is a flowchart illustrating an example process 600 operable to facilitate the generation and output of a transport stream that includes one or more images that are likely to be requested by a user. The process 600 may be carried out, for example, by a guide server 130 of FIG. 1 or any other device configured to deliver multimedia to one or more multimedia devices 105 of FIG. 1 or client devices 110 of FIG. 1. The process 600 can begin at 605, when a requested user action associated with an interactive guide is received. The requested user action associated with an interactive guide may be received, for example, by the guide server 130. The requested user action may be received from a multimedia device 105. In embodiments, the requested user action may identify a user interaction (e.g., browse request, search request, request for additional information screens, etc.) with an interactive guide that is being presented or displayed to the user. A user interaction with a guide may include any communication or request that causes a current presentation of media associated with the guide to be altered.

At 610, a transport stream may be generated, wherein the transport stream includes a media stream associated with the requested user action. The transport stream may be generated, for example, by the guide server 130. In embodiments, the guide server 130 may update a current interactive media guide context for the multimedia device 105 based upon the requested user action. The guide server 130 may generate a media stream that includes audio/video associated with a display that results from the requested user action, and the media stream may be added to a transport stream to be delivered to the multimedia device 105.

At 615, a determination may be made whether bandwidth available for delivery of a stream to the multimedia device 105 is consumed by the generated transport stream. The determination whether available bandwidth is consumed by the generated transport stream may be made, for example, by the guide server 130. In embodiments, the guide server 130 may compare the bandwidth required to deliver the transport stream to one or more maximum bandwidth thresholds. The one or more maximum bandwidth thresholds may be maximum bandwidth capacities associated with one or more network elements or transmission mediums that may be utilized in the delivery of the transport stream from the guide server 130 to the multimedia device 105.

If, at 615, the determination is made that bandwidth available for delivery of a stream to the multimedia device 105 is not consumed by the generated transport stream, the process 600 may proceed to 620. At 620, one or more images or media streams that are likely to be requested by a user may be generated. The one or more images may be generated, for example, by the guide server 130. In embodiments, based upon a current guide context (e.g., user interface context, time of day, etc.) at the multimedia device 105, the guide server 130 may identify one or more static pages (e.g., program information pages associated with one or more programs, etc.) that are likely to be requested by a user. The guide server 130 may generate video images associated with the identified static pages. The guide server 130 may determine the current guide context based upon the requested user action.

At 625, the one or more images or media streams may be added to the transport stream. The one or more images may be added to the transport stream, for example, by the guide server 130. In embodiments, the guide server 130 may supplement the generated transport stream with the one or more images.

At 630, a unique identifier may be added for each of the one or more images or media streams included within the transport stream. The unique identifier for each of the one or more images may be added to the transport stream, for example, by the guide server 130. In embodiments, the guide server 130 may tag each respective one of the video images to identify a user action that may require or produce the respective image.

At 635, the transport stream may be output to a subscriber device. For example, the transport stream may be output to a multimedia device 105 from which the requested user action was received.

Returning to 615, if the determination is made that available bandwidth is consumed by the transport stream, the transport stream may be output to a subscriber device at 635. For example, the transport stream may be output without an addition of one or more images that are likely to be later requested.

Figure 7:
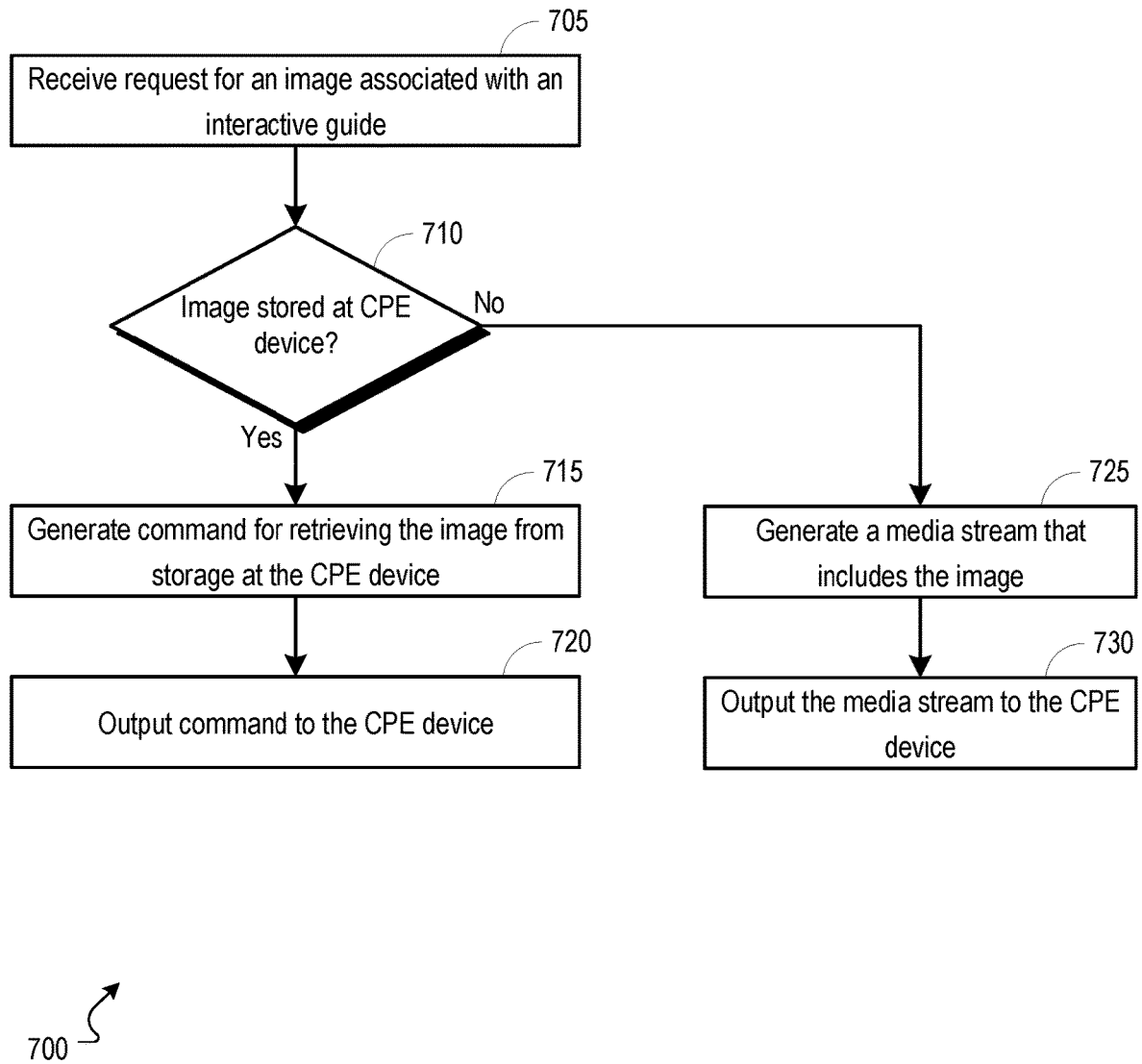
FIG. 7 is a flowchart illustrating an example process operable to facilitate the retrieval of a requested image from storage that includes one or images retrieved from a previously received transport stream.

FIG. 7 is a flowchart illustrating an example process 700 operable to facilitate the retrieval of a requested image from storage that includes one or images retrieved from a previously received transport stream. The process 700 may be carried out, for example, by a guide server 130 of FIG. 1 or any other device configured to deliver multimedia to one or more CPE (customer premise equipment) device (e.g., multimedia device 105 of FIG. 1, client devices 110 of FIG. 1, etc.). The process 700 can begin at 705, when a request for an image associated with an interactive guide is received. The request may be received, for example, by a guide server 130. In embodiments, the request may be a request for an image that is associated with a requested user action that is received at a multimedia device 105. For example, the requested image may be an image that is associated with a static page (e.g., program information pages associated with one or more programs, etc.) that is to be presented in response to a received user action.

At 710, a determination may be made whether the image is stored at the CPE device from which the request for the image is received. The determination whether the image is stored at the CPE device (e.g., multimedia device 105) may be made, for example, by the guide server 130. In embodiments, the guide server 130 may determine whether the requested image has previously been output to the CPE device. If the requested image was previously output to the CPE device, the guide server 130 may determine that the image is stored at the CPE device.

If, at 710, the determination is made that the image is stored at the CPE device, the process 700 may proceed to 715. At 715, a command for retrieving the image from storage at the CPE device may be generated. The command for retrieving the image may be generated, for example, by the guide server 130. In embodiments, the command may include instructions for the CPE device to retrieve the image from storage at the CPE device (e.g., guide data store 220 of FIG. 2). For example, the command may include a unique identifier that was associated with the image when the image was output from the guide server 130 to the CPE device (e.g., a unique identifier given to the image when the image was included within a transport stream that was delivered to the CPE device), and the unique identifier may serve to identify the image from storage at the CPE device. The command may be output from the guide server 130 to the CPE device at 720.

Returning to 710, if the determination is made that the image is not stored at the CPE device, the process 700 may proceed to 725. At 725, a media stream that includes the requested image may be generated. The media stream that includes the requested image may be generated, for example, by the guide server 130. In embodiments, the guide server 130 may retrieve or generate the requested image and may add the image to a media stream.

At 730, the media stream including the requested image may be output to the CPE device from which the request for the image was received. The media stream may be output to the CPE device, for example, by the guide server 130. In embodiments, the media stream may be added to a transport stream, and the transport stream may be output from the guide server 130 to the CPE device.

Figure 8:
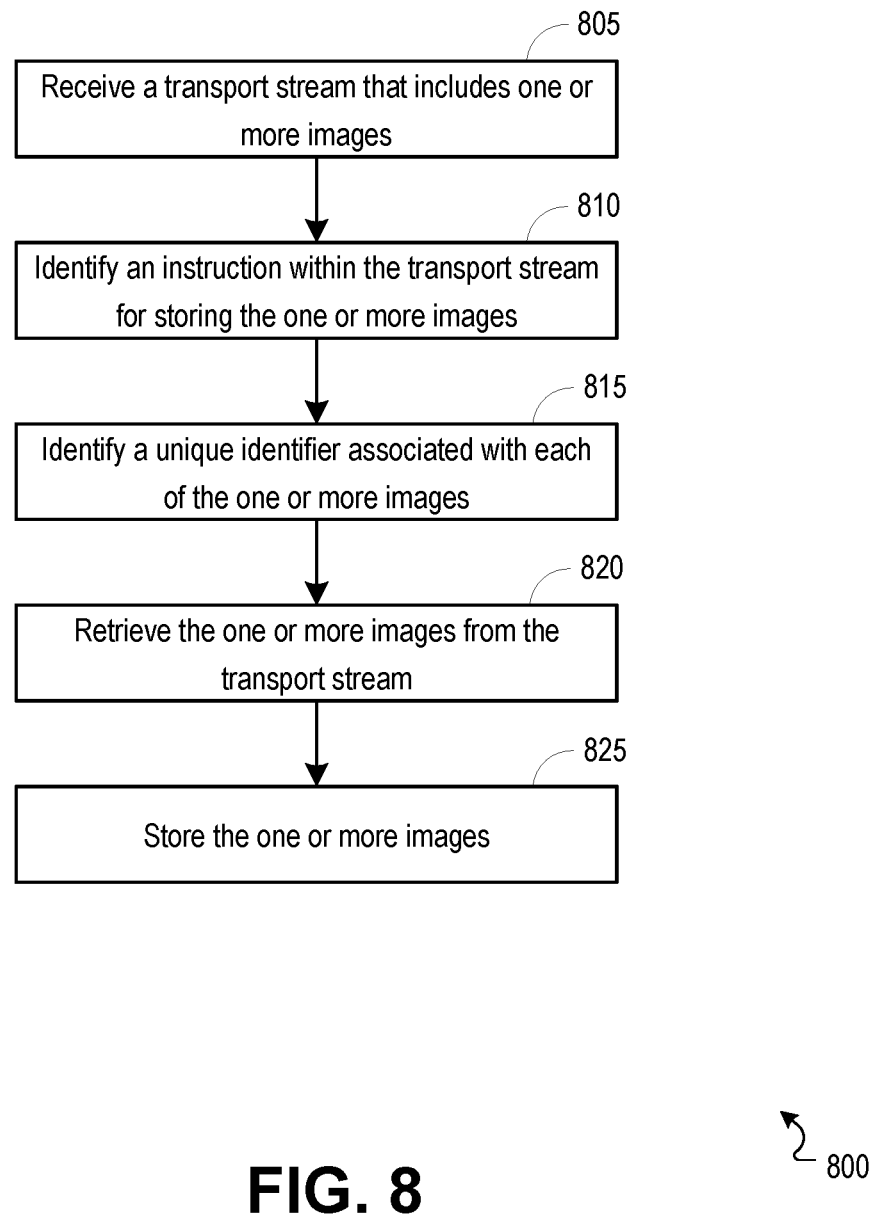
FIG. 8 is a flowchart illustrating an example process operable to facilitate a retrieval of one or more images from a transport stream.

FIG. 8 is a flowchart illustrating an example process 800 operable to facilitate a retrieval of one or more images from a transport stream. The process 800 may be carried out, for example, by a multimedia device 105 of FIG. 1 or any other device configured to deliver multimedia to one or more client devices 110 of FIG. 1. The process 800 can begin at 805, when a transport stream that includes one or more images is received. The transport stream may be received, for example, by a multimedia device 105. In embodiments, the transport stream may include a media stream associated with multimedia that is to be presented at the multimedia device 105 or associated client device 110 (e.g., media associated with a current guide context of an interactive guide), and the transport stream may include one or more video images associated with one or more static pages (e.g., program information pages associated with one or more programs, etc.). For example, the one or more images may be associated with one or more static pages that are likely to be requested by a user based upon a current guide context (e.g., user interface context, time of day, etc.) of an interactive guide presented by the multimedia device 105.

At 810, an instruction for storing the one or more images may be identified from within the transport stream. The instruction for storing the one or more images may be identified, for example, by the multimedia device 105 (e.g., by the guide module 215 of FIG. 2). In embodiments, the instruction may provide a unique identifier associated with each of the one or more images. The instruction may include a command for the guide module 215 to store the one or more images locally at the multimedia device 105 (e.g., at a guide data store 220 of FIG. 2).

At 815, a unique identifier associated with each of the one or more images may be identified. The unique identifier(s) associated with each of the one or more images may be identified, for example, by the multimedia device 105 (e.g., by the guide module 215). In embodiments, the guide module 215 may identify the unique identifier(s) associated with each of the one or more images from the instruction identified from within the transport stream.

At 820, the one or more images may be retrieved from the transport stream. The one or more images may be retrieved, for example, by the multimedia device 105 (e.g., by the guide module 215). In embodiments, the unique identifier(s) (e.g., the unique identifiers identified by the multimedia device 105 at 815) may be utilized by the guide module 215 to identify and retrieve each of the one or more images from the transport stream.

At 825, the one or more images may be stored. For example, the one or more images may be stored locally at the multimedia device 105 (e.g., at the guide data store 220). In embodiments, each of the one or more images may be stored within the guide data store 220 along with a unique identifier associated with the respective image and/or a tag identifying a user action that may require or produce the respective image.

Figure 9:
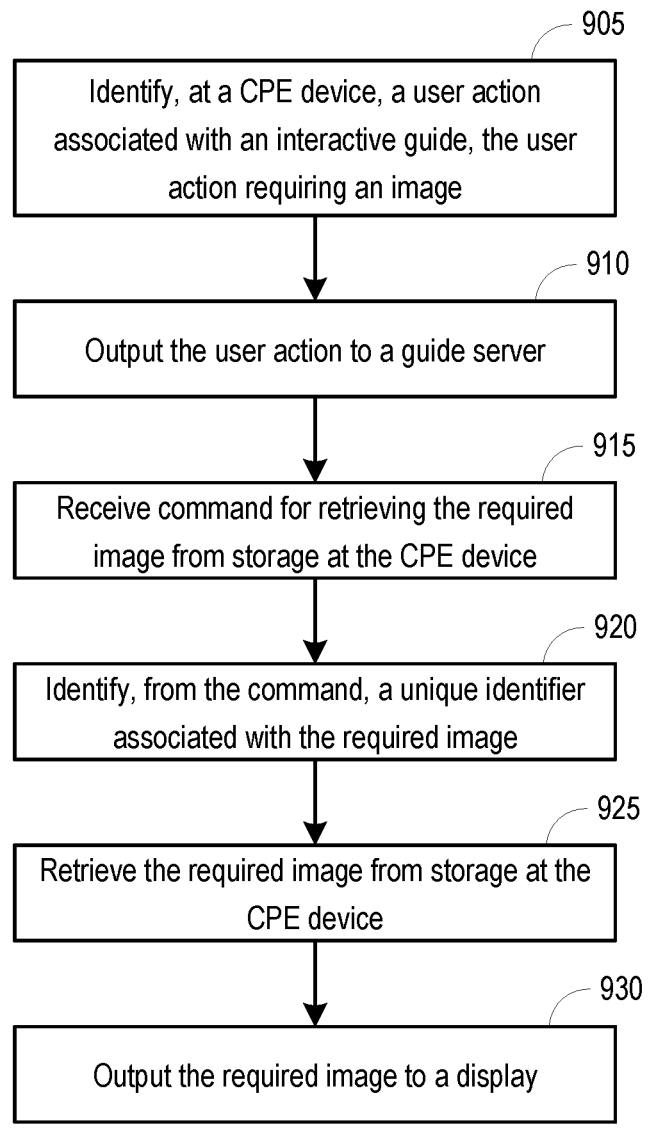
FIG. 9 is a flowchart illustrating an example process operable to facilitate a retrieval of a media stream from a transport stream, wherein the media stream is associated with a requested guide action, and wherein the transport stream carries a media stream associated with a current context of the guide.

FIG. 9 is a flowchart illustrating an example process 900 operable to facilitate a retrieval of a media stream from a transport stream, wherein the media stream is associated with a requested guide action, and wherein the transport stream carries a media stream associated with a current context of the guide. The process 900 may be carried out, for example, by a CPE device (e.g., multimedia device 105 of FIG. 1, client device 110 of FIG. 1, etc.) or any other device configured to receive a transport stream carrying media associated with a guide. The process 900 can begin at 905, when a user action associated with an interactive guide is identified at a CPE device, wherein the user action requires a presentation of an image. The user action may be identified, for example, by a multimedia device 105 (e.g., by a guide module 215 of FIG. 2). The user action may be identified from received user input. In embodiments, the multimedia device 105 may detect a user interaction (e.g., browse request, search request, request for additional information screens, etc.) with an interactive guide that is being presented or displayed to the user. A user interaction with a guide may include any communication or request that causes a current presentation of media associated with the guide to be altered. The user action may require presentation of a video image associated with one or more static pages (e.g., program information pages associated with one or more programs, etc.).

At 910, the user action may be output to a guide server. For example, the user action may be output from the multimedia device 105 to an upstream guide server (e.g., guide server 130 of FIG. 1), and the upstream guide server may update a current guide context for the multimedia device 105 to reflect a current context that is based upon the requested user action. In embodiments, the guide server 130 may identify an image required by the user action, and the guide server 130 may determine that the image has previously been output for storage at the multimedia device 105 from which the user action is received. The guide server 130 may generate and output to the multimedia device 105 a command/instruction for retrieving the identified image that is required by the user action.

At 915, a command for retrieving the required image from storage at the CPE device may be received. For example, the command may be received at the CPE device (e.g., by a guide module 215 of a multimedia device 105) from an upstream guide server (e.g., guide server 130). In embodiments, the command may provide an instruction for the multimedia device 105 to retrieve and present the required image from local storage associated with the multimedia device 105. For example, the command may instruct the guide module 215 to retrieve the required image from local storage of the multimedia device 105 (e.g., guide data store 220 of FIG. 2).

At 920, a unique identifier associated with the required image may be identified from the command. The unique identifier associated with the required image may be identified, for example, by the CPE device (e.g., by the guide module 215 of the multimedia device 105). In embodiments, the guide module 215 may identify the unique identifier that is included within the received command as a unique identifier associated with an image within local storage that is to be output for presentation.

At 925, the required image may be retrieved from storage associated with the CPE device. For example, the guide module 215 of a multimedia device 105 may identify and retrieve the required image from local storage of the multimedia device 105 (e.g., guide data store 220). In embodiments, the guide module 215 may identify an image for retrieval from the guide data store 220 by identifying a stored image having a unique identifier that matches the unique identifier that was identified from the command.

At 930, the required image may be output to a display. For example, the image may be output from the multimedia device 105 for presentation at a display device (e.g., client device 110 of FIG. 1).

Figure 10:
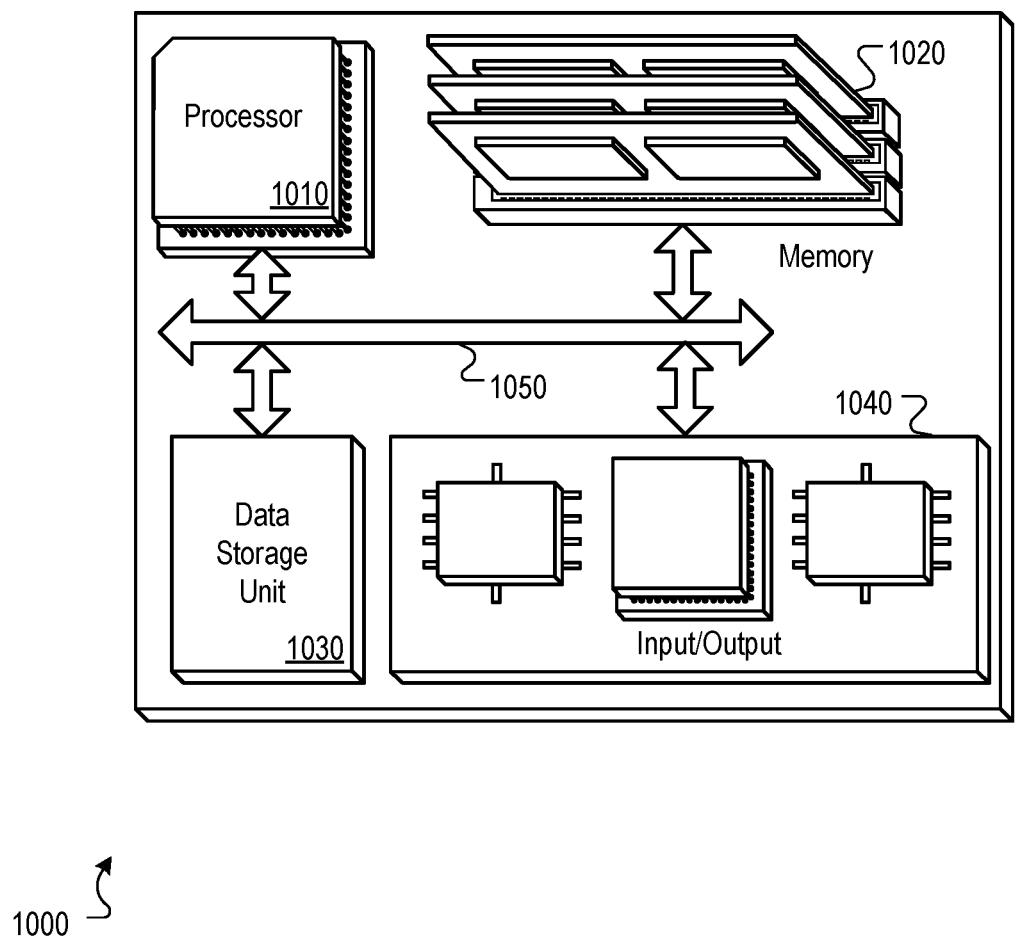
FIG. 10 is a block diagram of a hardware configuration operable to facilitate a multiplexed delivery of media associated with guide display options.

FIG. 10 is a block diagram of a hardware configuration 1000 operable to facilitate a multiplexed delivery of media associated with guide display options. The hardware configuration 1000 can include a processor 1010, a memory 1020, a storage device 1030, and an input/output device 1040. Each of the components 1010, 1020, 1030, and 1040 can, for example, be interconnected using a system bus 1050. The processor 1010 can be capable of processing instructions for execution within the hardware configuration 1000. In one implementation, the processor 1010 can be a single-threaded processor. In another implementation, the processor 1010 can be a multi-threaded processor. The processor 1010 can be capable of processing instructions stored in the memory 1020 or on the storage device 1030.

The memory 1020 can store information within the hardware configuration 1000. In one implementation, the memory 1020 can be a computer-readable medium. In one implementation, the memory 1020 can be a volatile memory unit. In another implementation, the memory 1020 can be a non-volatile memory unit.

In some implementations, the storage device 1030 can be capable of providing mass storage for the hardware configuration 1000. In one implementation, the storage device 1030 can be a computer-readable medium. In various different implementations, the storage device 1030 can, for example, include a hard disk device, an optical disk device, flash memory or some other large capacity storage device. In other implementations, the storage device 1030 can be a device external to the hardware configuration 1000.

The input/output device 1040 provides input/output operations for the hardware configuration 1000. In embodiments, the input/output device 1040 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 110 of FIG. 1 (e.g., television, mobile device, tablet, computer, STB, etc.). In embodiments, the input/output device can include driver devices configured to send communications to, and receive communications from one or more networks (e.g., subscriber network 120 of FIG. 1, WAN 115 of FIG. 1, local network 125 of FIG. 1, etc.) or servers (e.g., guide server 130 of FIG. 1).

Those skilled in the art will appreciate that the invention improves upon methods and systems for delivering media associated with an interactive guide. Methods, systems, and computer readable media can be operable to facilitate a multiplexed delivery of media associated with guide display options. A transport stream carrying media associated with a current context of an interactive guide application may be supplemented with one or more secondary streams that are associated with other contexts of the interactive guide application that are likely to be requested from subsequent user interactions. The other contexts of the interactive guide may be determined based upon a correlation between the other contexts and the current context of the interactive guide. When a user interaction occurs at a multimedia device, the multimedia device may retrieve a media stream associated with the user interaction from a transport stream that is currently being received by the multimedia device, from a buffer at the multimedia device, or from local storage associated with the multimedia device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
receiving a transport stream comprising a media stream associated with a current context of a guide and one or more media streams associated with one or more user actions, wherein the one or more media streams associated with the one or more user actions are added to the transport stream based upon a determination that the one or more user actions are likely to be performed, wherein the transport stream is generated by an upstream guide server in response to receiving a first requested user action from a multimedia device, and wherein the one or more media streams associated with the one or more user actions are determined by the upstream guide server in response to the received first requested user action, and wherein the one or more user actions are determined based upon a user-interaction history associated with the multimedia device, wherein the user-interaction history comprises a count identifying the number of times each of the one or more user actions is initiated following the first requested user action, wherein each of the one or more user actions and the first requested user action comprise user actions associated with user-interactions with a display of media previously received by the multimedia device;
identifying, at the multimedia device, a second requested user action associated with the guide;
identifying, from the media streams of the received transport stream, a media stream that is associated with the second requested user action;
retrieve the identified media stream from the transport stream; and
output the identified media stream to a display.

2. The method of claim 1, wherein the transport stream is received from the upstream guide server, and wherein the one or media streams associated with the one or more user actions are added to the transport stream by the upstream guide server based upon a correlation between each respective one of the one or more user actions and the current context of the guide.

3. The method of claim 1, wherein the media stream that is associated with the second requested user action is identified based upon a mapping of the second requested user action to a unique identifier associated with the media stream.

4. The method of claim 3, wherein the unique identifier associated with the media stream comprises a packet identifier.

5. The method of claim 1, further comprising:
buffering the received transport stream at a buffer of the multimedia device; and
wherein the identified media stream is retrieved from the buffer of the multimedia device.

6. The method of claim 1, further comprising:
wherein the received transport stream comprises one or more images; and
storing the one or more images at storage associated with the multimedia device.

7. The method of claim 1, further comprising:
outputting the second requested user action to an upstream guide server.

8. A multimedia device comprising:
a network interface that receives a transport stream comprising a media stream associated with a current context of a guide and one or more media streams associated with one or more user actions, wherein the one or more media streams associated with the one or more user actions are added to the transport stream based upon a determination that the one or more user actions are likely to be performed, wherein the transport stream is generated by an upstream guide server in response to receiving a first requested user action from the multimedia device, and wherein the one or more media streams associated with the one or more user actions are determined by the upstream guide server in response to the received first requested user action, and wherein the one or more user actions are determined based upon a user-interaction history associated with the multimedia device, wherein the user-interaction history comprises a count identifying the number of times each of the one or more user actions is initiated following the first requested user action, wherein each of the one or more user actions and the first requested user action comprise user actions associated with user-interactions with a display of media previously received by the multimedia device;
a guide module that:
identifies a second requested user action associated with the guide;
identifies, from the media streams of the received transport stream, a media stream that is associated with the second requested user action; and
retrieves the identified media stream from the transport stream; and
a client interface that outputs the identified media stream to a display.

9. The multimedia device of claim 8, wherein the transport stream is received from the upstream guide server, and wherein the one or media streams associated with the one or more user actions are added to the transport stream by the upstream guide server based upon a correlation between each respective one of the one or more user actions and the current context of the guide.

10. The multimedia device of claim 8, wherein the media stream that is associated with the second requested action is identified based upon a mapping of the second requested action to a unique identifier associated with the media stream.

11. The multimedia device of claim 10, wherein the unique identifier associated with the media stream comprises a packet identifier.

12. The multimedia device of claim 8, further comprising:
a buffer that buffers the received transport stream; and
wherein the identified media stream is retrieved from the buffer.

13. The multimedia device of claim 8, wherein the received transport stream comprises one or more images, and wherein the multimedia device further comprises storage that stores the one or more images.

14. One or more non-transitory computer readable media having instructions operable to cause one or more processors to perform the operations comprising:
receiving a transport stream comprising a media stream associated with a current context of a guide and one or more media streams associated with one or more user actions, wherein the one or more media streams associated with the one or more user actions are added to the transport stream based upon a determination that the one or more user actions are likely to be performed, wherein the transport stream is generated by an upstream guide server in response to receiving a first requested user action from a multimedia device, and wherein the one or more media streams associated with the one or more user actions are determined by the upstream guide server in response to the received first requested user action, and wherein the one or more user actions are determined based upon a user-interaction history associated with the multimedia device, wherein the user-interaction history comprises a count identifying the number of times each of the one or more user actions is initiated following the first requested user action, wherein each of the one or more user actions and the first requested user action comprise user actions associated with user-interactions with a display of media previously received by the multimedia device;
identifying, at the multimedia device, a second requested user action associated with the guide;
identifying, from the media streams of the received transport stream, a media stream that is associated with the second requested user action;
retrieve the identified media stream from the transport stream; and
output the identified media stream to a display.

15. The one or more non-transitory computer-readable media of claim 14, wherein the transport stream is received from the upstream guide server, and wherein the one or media streams associated with the one or more user actions are added to the transport stream by the upstream guide server based upon a correlation between each respective one of the one or more user actions and the current context of the guide.

16. The one or more non-transitory computer-readable media of claim 14, wherein the media stream that is associated with the second requested action is identified based upon a mapping of the second requested action to a unique identifier associated with the media stream.

17. The one or more non-transitory computer-readable media of claim 16, wherein the unique identifier associated with the media stream comprises a packet identifier.

18. The one or more non-transitory computer-readable media of claim 14, wherein the instructions are further operable to cause one or more processors to perform the operations comprising:
buffering the received transport stream at a buffer of the multimedia device; and
wherein the identified media stream is retrieved from the buffer of the multimedia device.

19. The one or more non-transitory computer-readable media of claim 14, wherein the instructions are further operable to cause one or more processors to perform the operations comprising:
wherein the received transport stream comprises one or more images; and
storing the one or more images at storage associated with the multimedia device.

20. The one or more non-transitory computer-readable media of claim 14, wherein the instructions are further operable to cause one or more processors to perform the operations comprising:
outputting the second requested user action to an upstream guide server.

* * * * *